United States Patent
Padhi et al.

(10) Patent No.: US 10,324,212 B2
(45) Date of Patent: Jun. 18, 2019

(54) PREDICTION AHEAD OF BIT USING VERTICAL SEISMIC PROFILE DATA AND GLOBAL INVERSION

(71) Applicant: Halliburton Energy Services, Inc., Houston, TX (US)

(72) Inventors: Amit Padhi, Houston, TX (US); Mark Elliott Willis, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/756,568

(22) PCT Filed: Aug. 1, 2017

(86) PCT No.: PCT/US2017/044966
§ 371 (c)(1),
(2) Date: Feb. 28, 2018

(87) PCT Pub. No.: WO2019/027449
PCT Pub. Date: Feb. 7, 2019

(65) Prior Publication Data
US 2019/0049612 A1 Feb. 14, 2019

(51) Int. Cl.
*G01V 1/40* (2006.01)
*G01V 1/50* (2006.01)

(52) U.S. Cl.
CPC ......... *G01V 1/50* (2013.01); *G01V 2210/161* (2013.01); *G01V 2210/614* (2013.01); *G01V 2210/6226* (2013.01); *G01V 2210/63* (2013.01)

(58) Field of Classification Search
USPC .......................................................... 702/6
See application file for complete search history.

(56) References Cited

U.S. PATENT DOCUMENTS

| 5,144,589 A | 9/1992 | Hardage |
| 2003/0086335 A1 | 5/2003 | Naville et al. |

(Continued)

FOREIGN PATENT DOCUMENTS

WO WO-2016/135505 A1 9/2016

OTHER PUBLICATIONS

International Search Report and Written Opinion from PCT/US2017/044966, dated Jan. 29, 2018, 9 pages.

*Primary Examiner* — Aditya S Bhat
(74) *Attorney, Agent, or Firm* — Benjamin Fite; C. Tumey Law Group PLLC

(57) ABSTRACT

Embodiments of the subject technology provide for predicting seismic impedance. The subject technology generates a corridor stack based on vertical seismic profile (VSP) data of a wellbore in a subterranean formation. The subject technology generates an initial estimate of a velocity model for the subterranean formation below the wellbore. The subject technology generating a density model for the subterranean formation below the wellbore based on information from nearby wells. The subject technology inverts, based on a global inversion algorithm and the initial estimate of the velocity model, the generated corridor stack to determine a set of velocity models. The subject technology generates impedance models in a depth domain based on the generated density model and the set of velocity models. Further, the subject technology stores the generated impedance models.

28 Claims, 8 Drawing Sheets

(56) References Cited

U.S. PATENT DOCUMENTS

| | | | |
|---|---|---|---|
| 2010/0118653 A1* | 5/2010 | He | G01V 1/303 367/57 |
| 2011/0267921 A1 | 11/2011 | Mortel et al. | |
| 2012/0059633 A1* | 3/2012 | Dutta | G01V 1/303 703/2 |
| 2017/0153344 A1 | 6/2017 | Lafet et al. | |

* cited by examiner ured features. For example, VSP analysis can be used to image the

PREDICTION AHEAD OF BIT USING VERTICAL SEISMIC PROFILE DATA AND GLOBAL INVERSION

TECHNICAL FIELD

The present description generally relates to predicting seismic impedances of subsurface rock formations.

BACKGROUND

Vertical Seismic Profile (VSP) analysis is a technique used to conduct geophysical surveys of subterranean features. For example, VSP analysis can be used to image the earth's subsurface in the proximity of a wellbore during the drilling or operation of a well. In an example, one or more seismic energy sources are located at the surface and one or more seismic detectors are located within a wellbore. A seismic profile based on information regarding the subsurface can be determined based on the detection of reflected seismic energy that originates from the seismic energy sources at the surface.

Figure 1:
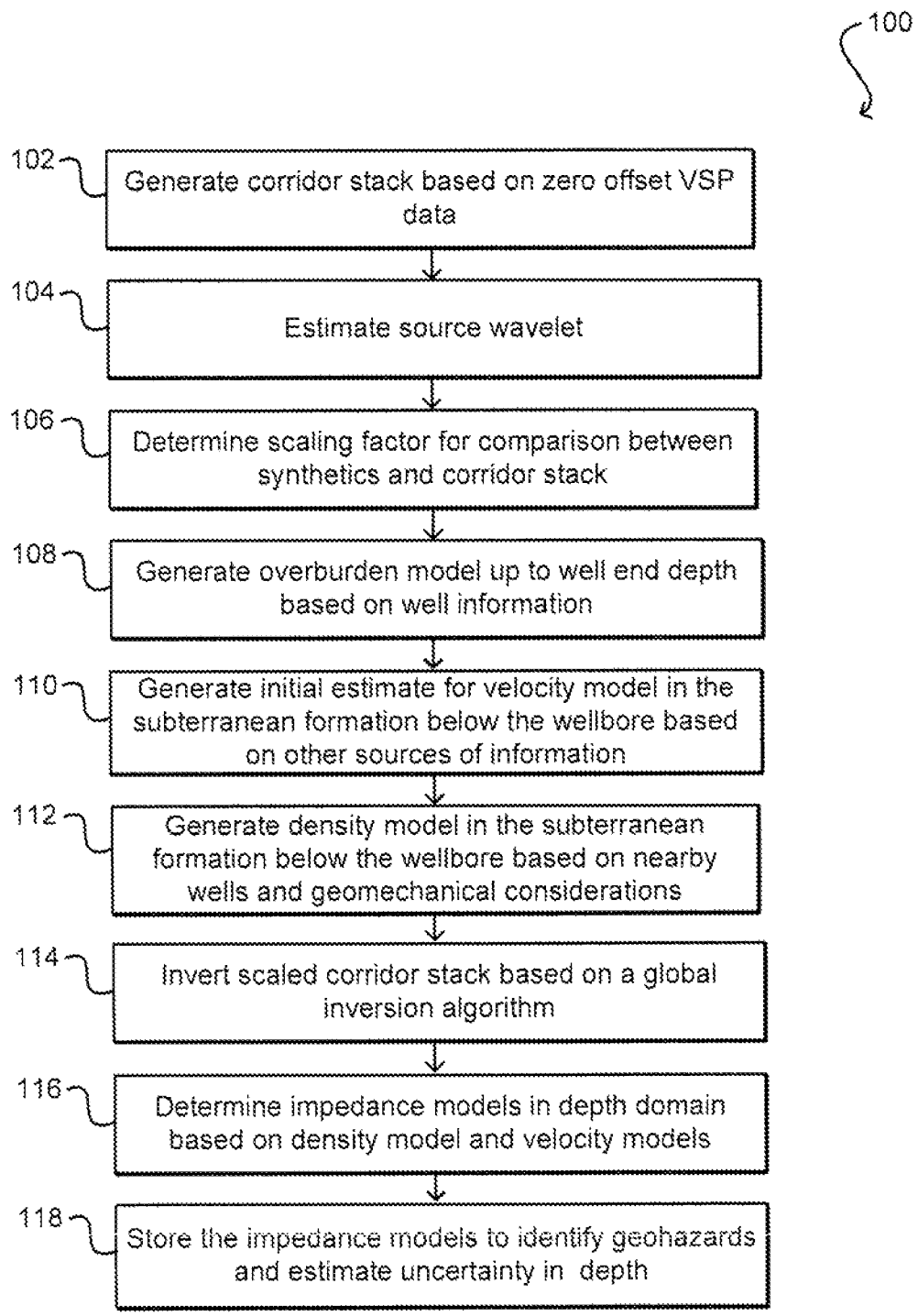
FIG. 1 illustrates a flowchart of an example process for utilizing zero offset vertical seismic profile analysis to predict seismic impedances in accordance with some implementations.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Surface seismic data combined with sparse well log data generally produces a depth map of the subsurface that is only an approximate representation of the ground truth. Accurate prediction of depths of rock formations from such data types is dependent on the accuracy of the velocity model obtained from the analysis of seismic and well log data. Seismic velocity analysis may be fraught with pitfalls due to imperfect assumptions about the subsurface and also use of approximations to aid computation with large datasets. Additionally, the surface seismic data available may be of low enough resolution such that certain large impedance contrast formations may not be interpretable. Under such circumstances, additional tools and techniques may be required for higher accuracy prediction of rock formations lying ahead of the drill bit (e.g., a tool used to crush or cut rock in a given drilling rig).

In some cases, zero offset vertical seismic profile (VSP) corridor stacks may undergo inversion for predicting impedances ahead of the drill bit in the depth domain. Such inversion techniques may utilize an initial guess of the smooth background velocity model obtained generally from surface seismic migration velocity analysis and/or nearby well logs. Additionally, a density model obtained using geomechanical considerations may be utilized to generate an initial smooth background impedance model. A local gradient based inversion is then performed to generate an updated impedance model. After dividing the updated impedance model by the density model, an updated velocity model is generated. This updated velocity model is further used to convert the updated impedance model to the depth domain as the actual impedance model is obtained in the time domain. Another way to update an initial background impedance model is by integrating the corridor stack and then adding the integrated corridor stack to the background impedance model. The final impedance model is once again converted to the depth domain using the same techniques as mentioned above.

Such techniques that utilize local inversion are however strongly dependent on the background initial model and hence have a larger probability of providing a prediction with higher inaccuracy. Additionally, such techniques may or may not be capable of providing error estimates of depth depending on the formulation of the inversion problem. For example, if the local inversion is a Bayesian formulation then an uncertainty estimate may be provided. However, in the second case described above where an integrated corridor stack is added to the background model, no uncertainty can be calculated. To alleviate such issues, the subject technology as described herein provides implementations for a global inversion based prediction ahead of the drill bit. A global inversion scheme as described in implementations herein is generally significantly less dependent on the background initial model than techniques that utilize local inversion, thereby making the subject implementations more impervious to inaccurate estimations in the background initial model.

In a zero offset VSP survey, at below a depth in which a given well has been drilled, seismic reflections are collected from the receivers in a zero-offset configuration. A stacked trace referred to as a corridor stack can be produced from those seismic reflections, and the corridor stack can be inverted for estimating seismic impedances below the well.

The following discussion describes, in further detail, an example flowchart for a process that predicts high or low seismic impedance formations, and example diagrams illustrating a comparison of field corridor stack with final inversion result best model synthetics, an impedance model w depth obtained after global in and multiple realizations of the velocity model obtained by collecting all inversion models.

FIG. 1 conceptually illustrates a flowchart of an example process 100 for petrophysical property prediction and facies classification. Although this figure, as well as other process illustrations contained in this disclosure may depict functional steps in a particular sequence, the processes are not necessarily limited to the particular order or steps illustrated. The various steps portrayed in this or other figures can be changed, rearranged, performed in parallel or adapted in various ways. Furthermore, it is to be understood that certain steps or sequences of steps can be added to or omitted from the process, without departing from the scope of the various implementations. The process 100 may be implemented by one or more computing devices or systems in some implementations, such as the processor 538 described in FIG. 5 and/or the computing device 700 described in FIG. 7.

At block 102, a corridor stack (e.g., a field corridor stack) is generated using zero offset VSP data for a wellbore in a subterranean formation. In one example, a seismic source (e.g., a device that generates controlled seismic energy and directs this energy into an underground formation) is activated at or near the head of a wellbore of a well and a receiver (or multiple receivers as discussed below) records the signal at fixed depths in the wellbore. Several shots can be recorded (and stacked) at the same depth interval to determine the zero offset VSP data. Although zero offset VSP data is discussed herein, the subject technology in at least one implementation may also acquire and utilize other VSP data such as offset VSP data, walkaway VSP data, and the like, which can be transformed and/or pre-processed for performing the other steps of process 100 described below. In at least one implementation, zero offset VSP uses multiple receivers to collect data. The data collected on these multiple receivers are processed and stacked together to finally generate a corridor stack, which is a single trace.

At block 104, a source wavelet is estimated using statistical information. Such statistical information may be provided from an outside source (e.g., another software application) that may apply statistical techniques on seismic data and/or well logs. It is appreciated, however, that any appropriate source wavelet may be utilized in accordance with implementations of the subject technology.

At block 106, a scaling factor is determined for comparison between synthetics (discussed further below) and the determined corridor stack. Such a scaling factor is obtained from the ratio of the root mean square (RMS) amplitudes from synthetic (computed using the well log data collected in the already drilled section of the well and the statistical wavelet) and field corridor stack for a crest or trough identified on both the traces. This scaling factor can be multiplied with the field corridor stack to make the amplitudes comparable to the synthetics produced by the forward modeling methodology which is embedded in the inversion scheme. At block 108, an overburden model up to a well end depth is generated based on well information. The well information, for example, may include information from well logs for compressional-wave velocity ($V_p$) and/or density. The overburden model velocities and densities may be kept fixed during the execution of the inversion algorithm. In at least one example, such overburden model velocities and densities are utilized to compute synthetic data for comparison with the field corridor stack because the overburden model velocities and densities can control the timing of events (e.g., troughs and crests) on the synthetic data trace.

At block 110, an initial estimate is determined for a velocity model in the subterranean formation below the wellbore (e.g., at depths lower than a depth of the bottom of the wellbore) based on one or more sources of information. For example, information from other nearby wells may be utilized to determine the initial estimate for the velocity model. Additionally, the initial velocity model may be based on information from a surface seismic migration velocity analysis.

At block 112, a density model in the subterranean formation below the wellbore is generated. The density model may be generated based on information from nearby wells and or geomechanical considerations. In an implementation, density can be fixed or updated as a function of velocity using rock physics relationships based on, for example, Gardner's equation (e.g., an empirical equation that relates P-wave velocity to bulk density). If the density is kept fixed, an a priori estimation may be made based on geomechanical considerations.

At block 114, the corridor stack is inverted based on a global inversion algorithm to generate multiple velocity models. The determined scaling factor may be applied to the corridor stack in at least one implementation at block 114. An example of a global inversion algorithm utilized in block 114 may be an evolutionary algorithm. One example of an evolutionary algorithm may be a differential evolution algorithm, which may be utilized in the block 114 as such an algorithm is highly parallelizable on one or more computing devices (e.g., resulting in potential faster processing times), including, for example, the processor 538 described in FIG. 5 and/or the computing device 700 described in FIG. 7. Further, an evolutionary algorithm may be more readily implemented (e.g., with lesser complexity) for execution on such computing devices. It is appreciated that any appropriate evolutionary algorithm may be utilized including any appropriate population-based optimization algorithm such as genetic algorithm, particle swarm optimization, or ant colony optimization, etc.

In implementations of the global inversion process, an objective function is maximized or minimized. For example, an objective function may attempt to maximize a cross-correlation between the corridor stack and synthetic data (e.g., synthetic seismograms) that are produced by a velocity model. In an example, the global inversion algorithm works with a population of models to converge on models that generate synthetics that substantially match with the real field data (e.g., the generated corridor stack). Since the evolutionary algorithm determines multiple models that fit the corridor stack with a high correlation, uncertainty estimates can be made using the suite of "good" models that are obtained.

In an example, synthetics (e.g., synthetic seismograms) are produced by 1) multiplying a velocity model (e.g., the generated initial estimate of the velocity model) with a fixed density model (e.g., the generated density model) to generate an impedance model, 2) by differentiating the impedance model, a reflectivity series is generated, and 3) the reflectivity series undergoes convolution with the estimated source wavelet to generate synthetics. Implementations of the subject technology therefore model normal incidence seismograms by convolving a source wavelet with a reflectivity series computed for a stack of layers. Reflectivity may be calculated from impedances which are determined by multiplying velocities and densities for all layers. Each layer may have a velocity and density assigned to the particular layer. The layers below the well, whose properties are being inverted for updating, may be parameterized using fixed time thicknesses. Hence, the actual layer thickness may be updated throughout the inversion steps described further below by multiplying velocities at a given generation of a differential evolution algorithm and for a given population member with time thicknesses. On the other hand the overburden model thicknesses are kept fixed and there is no need for update as the inversion scheme proceeds.

Implementations of the subject technology, as mentioned above, may utilize a differential evolution algorithm, which is a population-based evolutionary algorithm. In an example, the differential evolution algorithm generates a random initial population x of members (size NP) that evolve to retain superior members and discard relatively worse members. The population members are referred to as solutions of the inverse problem. Each solution is a vector consisting of velocities of each layer being considered for updating. Density can be kept fixed or updated as a function of velocity using rock physics relationships such as the Gardner's equation, mentioned above. If the density is kept fixed, an a priori estimation may be made based on geomechanical considerations.

In one or more implementations, a random set of solutions corresponding to the population is generated with a fixed population size. For example, the population size may be 100, and each population member is a potential inversion solution. In a first iteration, a randomized population, including random numbers, is generated. These random numbers may be generated by a random number generator based on a search window, which may have been defined by a user. The search window may be selected in the neighborhood of the initial velocity model, and a randomly created population referred to as the parent population is then generated.

For example, the initial random population of solutions may be generated by choosing random numbers from a model space defined in the neighborhood of an initial model estimate. Such an initial estimate can also be generated using other data sources. Further, the random number generator may use any kind of distribution as appropriate.

The randomly generated parent population undergoes three main steps before moving to the next iteration: 1) mutation, 2) crossover, and 3) selection, which are discussed further below. Through repeated iteration, a good set of population members may be converged to (e.g., in which most of the solutions would be close to the right answer).

The differential evolution algorithm applies steps analogous to a genetic algorithm to evolve the population to have superior solutions filling its slots over different generations G, although the differential evolution algorithm uses different techniques from those in a genetic algorithm for those analogous steps. With respect to the mutation step mentioned above, for example, at a given generation (e.g., iteration), the parent population may be used to generate a mutant population using equation (1), which may be denoted by the following:

$$v_i = x_{r1} + F(x_{r2} - x_{r3}) \quad (1)$$

In equation (1), for each i in (1, . . . NP), a combination of three distinct parent population members $x_{r1}$, $x_{r2}$, $x_{r3}$ with indices (r1, r2 and r3) are selected to generate a mutant vector $v_i$. F is a user defined step size that can be between 0 and 2 in an example and corresponds to a mutation step.

In order to improve convergence with relatively smaller population sizes, a modified version of equation (1) is provided, which may be denoted as equation (2) as follows:

$$v_{i,j} = x_{best(i,j)} + (Fnew_{i,j})(x_{r2,j} - x_{r3,j}) \quad (2)$$

In equation (2), $x_{best}$ represents the best population member of the already generated population. In this technique, F is made to vary for each model parameter in each mutant vector calculation in every generation, which is implemented using equation (2) above and equation (3) below, which may be denoted by the following:

$$Fnew_{i,j} = F + 0.0001 * rand \quad (3)$$

After mutation has been applied to create the same number of mutant solutions as the parent population, the aforementioned crossover step is performed. In particular, after generating a mutant population v, a trial population u is generated using equation (4), which may denoted by the following:

$$u_{ij} = v_{ij}, \text{ if } rand_j <= CR,$$
else
$$u_{ij} = x_{ij} \quad (4)$$

This crossover step represented in equation (4) above is comparable to a crossover in a genetic algorithm and may utilize a user defined crossover probability/rate (CR). In equation (4), rand is a random number (e.g., uniform distribution between 0 and 1) that is generated for each model parameter in the vector. In equation (4), i represents each population member, and j represents each segment of each population member. In determining an inverse solution for a model, the subsurface below the depth of the well (e.g., that corresponds to a region of interest for applying the inversion) is divided into layers, which may also be referred to as segments. In an example, this portion of the subsurface for inverting may be divided into a predetermined number of layers, such as 70 layers. Each layer will have a velocity. As a result, 70 velocities are to be inverted, with the 70 velocities forming an individual population member, and each velocity representing a segment (or layer) for that individual population member. Thus, j represents each individual velocity in the 70 velocities, and i represents each individual population member.

In equation (4), $u_{ij}$ becomes equal to the corresponding mutated population member segment if a random number generator (which may be continuously running) is below a certain cutoff referred to as a crossover probability/rate ("CR"), else $u_{ij}$ becomes equal to the corresponding population member segment from the original population, $x_{ij}$. In an example, the crossover rate CR may have a range of values between 0.7 to 0.9.

After the crossover step has been performed to generate the same number of population members as included in the original parent population, the aforementioned selection step is then performed. In the selection step, a comparison of the trial population and parent population at that generation is performed to generate a child population. The comparison may be based on the objective function computed for each member of both populations. For each slot of the child population, the corresponding parent and trial population members are compared and the superior solution/member (e.g., the lesser the objective value, then the superior the solution) is retained in the child population.

After generating the first child population, the differential evolution algorithm again iterates through the aforementioned mutation, crossover, and selection steps until a predefined stopping criteria is satisfied. For example, the stopping criteria may be a specified number of generations/iterations (e.g., a fixed number of iterations), an acceptable objective value level, some other heuristic criteria and/or a combination of at least some of the aforementioned stopping criteria.

In an example for determining the final population, each member of the final mutated population, the final crossover (e.g., trial) population, and the original parent population for that iteration, are compared (e.g., because each of these three populations include the same number of members) based on a given objective function. As mentioned before, the objective function may be a cross-correlation between the corridor stack and the synthetics. It is appreciated that other types of objective functions may be utilized, such as an error between a synthetic and the corridor stack.

In the example where the objective function is a cross-correlation between the corridor stack and the synthetics, a higher cross-correlation value will correspond to a better solution. In the example where the objective function corresponds to a measure of error, a lesser error value will correspond to a better solution. The respective population member for the child population is selected from the final mutated population, the final crossover population, or the original parent population for that iteration based on which population member corresponds to the best solution (e.g., the highest cross-correlation value or the lowest error value in the examples discussed before).

After the stopping criteria is satisfied, the final selected population may be utilized as the inversion answer (e.g., the solution or output of the inversion algorithm representing the velocities). Alternatively or conjunctively, each of the respective population members from every iteration may be compared in aggregate to determine a probabilistic estimation of the inversion answer, which may be then used to provide an uncertainty estimate over the individual inversion velocities.

At block 116, impedance models are determined in a depth domain using the fixed density model and velocity models obtained by inversion from block 114. Impedances are calculated for every population member by multiplying velocities with densities. After the inversion step is complete and a suite of updated "good" velocity models is obtained, the velocity and the density values can be multiplied to get the impedances. These impedance models are then converted into the depth domain using the same velocity models after inversion. These depth domain impedance models can be utilized to identify potential geohazards ahead of the drill bit while also providing a depth uncertainty estimation.

At block 118, the impedance models are stored (e.g., for future retrieval and/or display and/or analysis). Additionally, in some implementations, the stored impedance models may be provided for display to identify geohazards and estimate uncertainty in the depth domain of the well. An example display of impendence models is described below in FIG. 3 discussed below.

Figure 2:
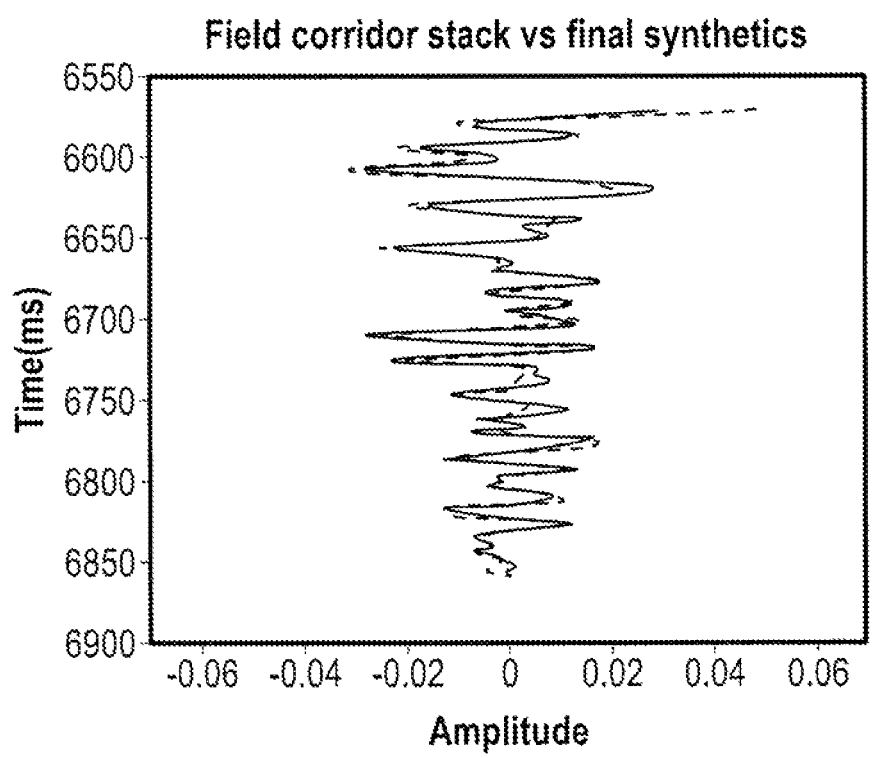
FIG. 2 illustrates a plot of an example of a comparison of a field corridor stack with a final inversion result of best model synthetics in accordance with some implementations.

FIG. 2 illustrates a plot 200 of an example of a comparison of values of the field corridor stack (e.g., determined in block 102) with a final inversion result of best model synthetics (e.g., determined in block 114) in accordance with some implementations. In the plot 200, the y-axis represents values of time (ms), and the x-axis represents values of amplitude. As shown, the correlation close to 94% in the example plot 200 of FIG. 2.

Figure 3:
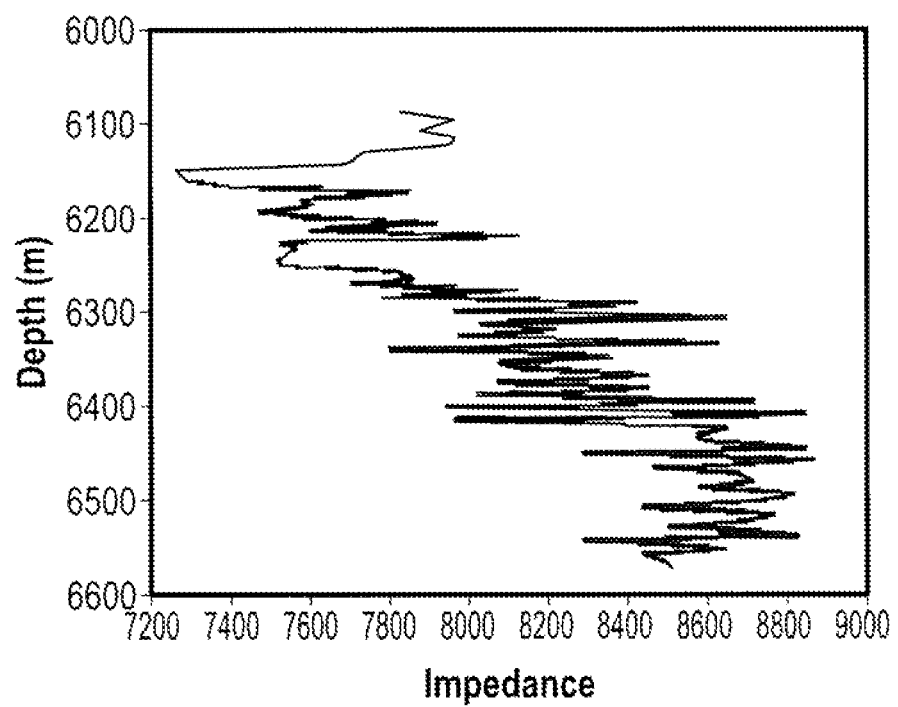
FIG. 3 illustrates a plot of an example of an impedance model in a depth obtained after global inversion in accordance with sonic implementations.

FIG. 3 illustrates a plot 300 of an example of an impedance model in depth obtained after global inversion in accordance with some implementations. In the plot 300, the y-axis represents values of depth (m), and the x-axis represents values of impedance. FIG. 3 shows the impedance model plot in depth obtained by multiplying the best inverted velocity model (e.g., as shown in the plot 200 in FIG. 2) with a fixed density model and then converting the time domain inversion result to depth using the inverted velocity model. This depth versus impedance model can help identify sharp contrasts in seismic property of rocks in the subterranean formation below the wellbore and potential geohazards ahead of the drill bit.

Potential geohazards may be identified utilizing the plot 300. For example, as shown in the plot 300, at a depth of approximately 6,250 m, there is a sizable jump in impedance (e.g., when compared to the above depth) that may indicate, e.g., a very strong and/or very stiff rock that could be a geohazard during drilling, or may indicate that the floor pressure is high at that depth, which can also be a geohazard. Further, at a depth of approximately 6,150 m in the plot 300, there may also be a geohazard based on the same type of analysis. At a given depth where a corresponding impedance is high, this could indicate areas where salt is located, which may be a hazard while drilling (e.g., as the drill bit may get stuck in the salt while drilling). Sudden changes in impedances on the plot 300 therefore may indicate a potential geohazard that can be planned for in advance of drilling.

Figure 4:
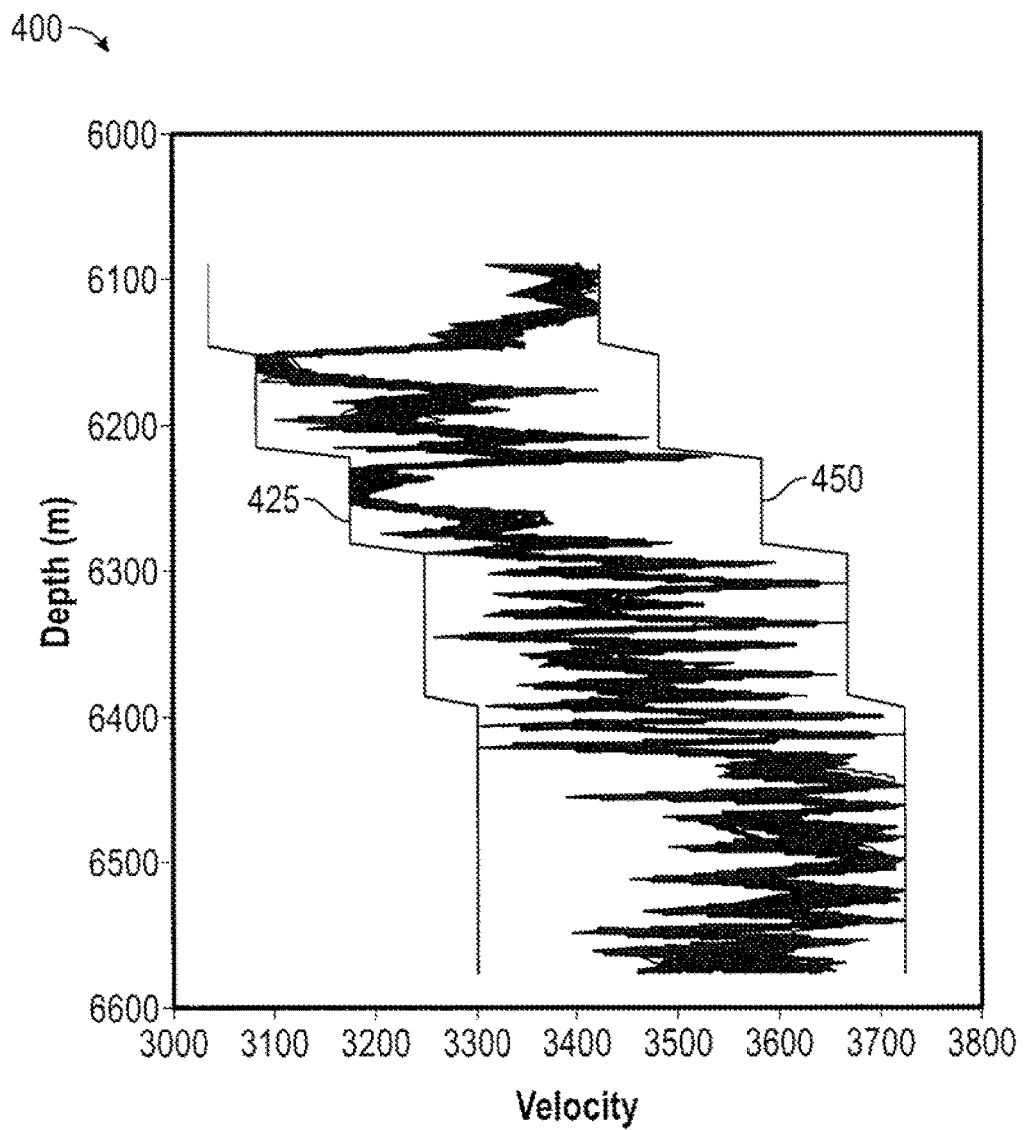
FIG. 4 illustrates a plot of an example of multiple realizations of a velocity model obtained by collecting all inversion models that show a correlation value higher than a chosen threshold in accordance with some implementations.

FIG. 4 illustrates a plot of an example of multiple realizations of a velocity model obtained by collecting all inversion models that show a correlation value higher than a chosen threshold in accordance with some implementations. FIG. 4 shows a suite of velocity models obtained after inversion using the differential evolution algorithm. The velocity models produced synthetics that had a correlation with the field corridor stack of 92.5% or greater. Since a suite of velocity models is obtained (e.g., from a scheme like the differential evolution algorithm discussed above) that have comparable correlation levels when corresponding synthetics are compared with the corridor stack, multiple depths can be predicted for a target layer and an uncertainty level can be assessed for the depth of the target layer. Additionally, the suite of models is obtained by inversion using a fairly wide search window including lower boundaries 425 and upper boundaries 450 as illustrated in FIG. 4. The upper and lower boundaries of the search window may change depending on the depth as shown in FIG. 4. In an example, the search window is selected around an initial guess for velocities from sources like surface seismic data analysis. Advantageously, even if the initial guess is not the most optimal, using a global scheme for inversion can still determine the globally optimum solution and minimally depends on the choice of the initial model. In contrast, a local inversion scheme such as a conjugate gradient or a steepest descent method, may depend heavily on the choice of the initial velocity model and could be prone to larger errors compared to the differential evolution algorithm for the same initial model.

Figure 5:
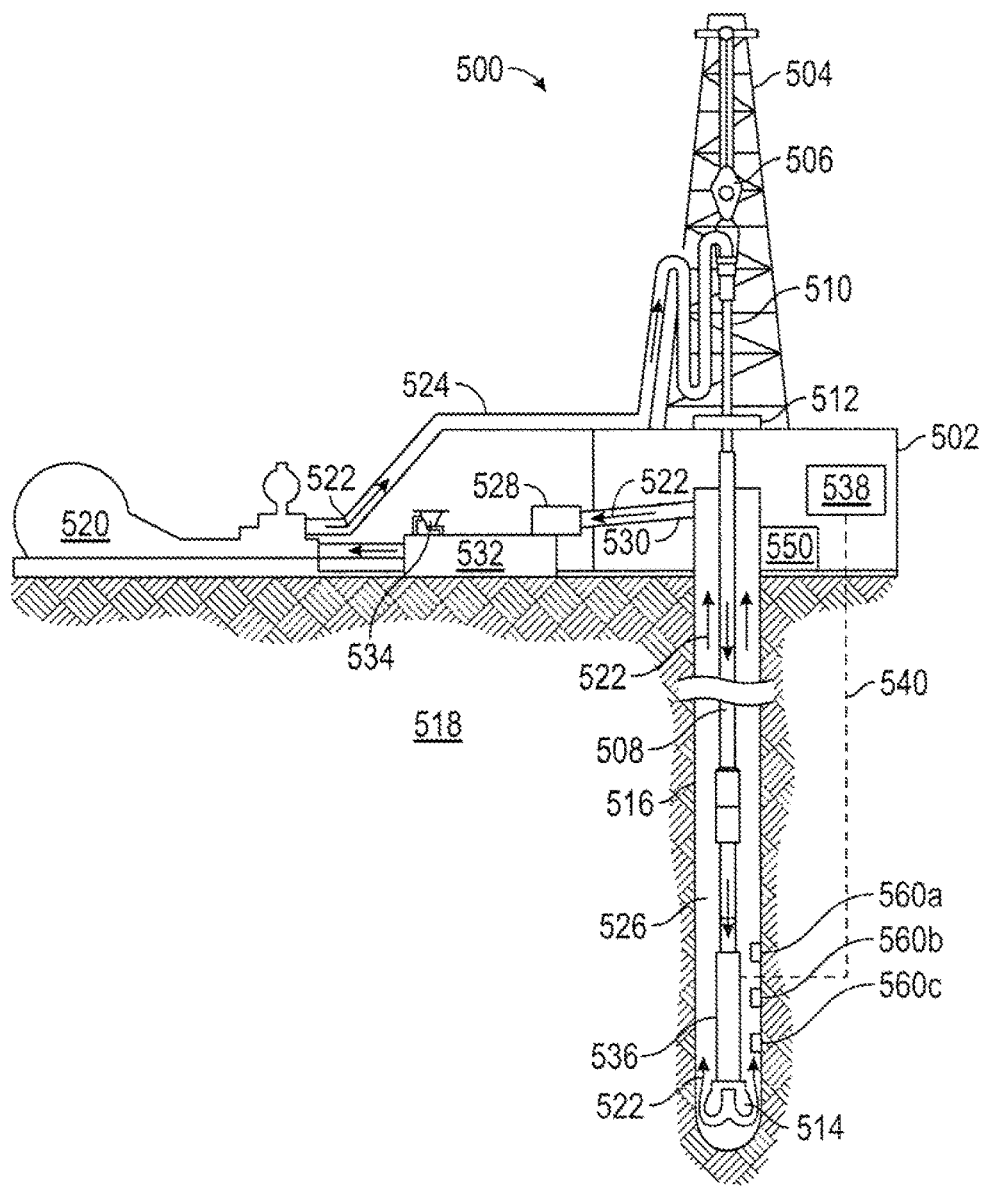
FIG. 5 illustrates an exemplary drilling assembly for implementing the processes described herein in accordance with some implementations.

FIG. 5 illustrates an exemplary drilling assembly 500 for implementing the processes described herein. It should be noted that while FIG. 5 generally depicts a land-based drilling assembly, those skilled in the art will readily recognize that the principles described herein are equally applicable to subsea drilling operations that employ floating or sea-based platforms and rigs, without departing from the scope of the disclosure.

In one or more implementations, the example process 100 described above begins after the drilling assembly 500 drills a wellbore 516 penetrating a subterranean formation 518. It is appreciated, however, that any processing performed in the process 100 by any appropriate component described herein may occur only uphole, only downhole, or at least some of both (i.e., distributed processing). As illustrated, the drilling assembly 500 may include a drilling platform 502 that supports a derrick 504 having a traveling block 506 for raising and lowering a drill string 508. The drill string 508 may include, but is not limited to, drill pipe and coiled tubing, as generally known to those skilled in the art. A kelly 510 supports the drill string 508 as it is lowered through a rotary table 512. A drill bit 514 is attached to the distal end of the drill string 508 and is driven either by a downhole motor and/or via rotation of the drill string 508 from the well surface. As the drill bit 514 rotates, it creates the wellbore 516 that penetrates various subterranean formations 518.

A pump 520 (e.g., a mud pump) circulates drilling mud 522 through a feed pipe 524 and to the kelly 510, which conveys the drilling mud 522 downhole through the interior of the drill string 508 and through one or more orifices in the drill bit 514. The drilling mud 522 is then circulated back to the surface via an annulus 526 defined between the drill string 508 and the walls of the wellbore 516. At the surface, the recirculated or spent drilling mud 522 exits the annulus 526 and may be conveyed to one or more fluid processing unit(s) 528 via an interconnecting flow line 530. After passing through the fluid processing unit(s) 528, a "cleaned" drilling mud 522 is deposited into a nearby retention pit 532 (i.e., a mud pit). While illustrated as being arranged at the outlet of the wellbore 516 via the annulus 526, those skilled in the art will readily appreciate that the fluid processing unit(s) 528 may be arranged at any other location in the drilling assembly 500 to facilitate its proper function, without departing from the scope of the scope of the disclosure.

Chemicals, fluids, additives, and the like may be added to the drilling mud 522 via a mixing hopper 534 communicably coupled to or otherwise in fluid communication with the retention pit 532. The mixing hopper 534 may include, but is not limited to, mixers and related mixing equipment known to those skilled in the art. In other implementations, however, the chemicals, fluids, additives, and the like may be added to the drilling mud 522 at any other location in the drilling assembly 500. In at least one implementation, for example, there may be more than one retention pit 532, such as multiple retention pits 532 in series. Moreover, the retention pit 532 may be representative of one or more fluid storage facilities and/or units where the chemicals, fluids, additives, and the like may be stored, reconditioned, and/or regulated until added to the drilling mud 522.

The processor 538 may be a portion of computer hardware used to implement the various illustrative blocks, modules, elements, components, methods, and algorithms described herein. The processor 538 may be configured to execute one or more sequences of instructions, programming stances, or code stored on a non-transitory, computer-readable medium. The processor 538 can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some implementations, computer hardware can further include elements such as, for example, a memory (e.g., random access memory (RAM), flash memory, read only memory (ROM), programmable read only memory (PROM), erasable programmable read only memory (EPROM)), registers, hard disks, removable disks, CD-ROMs, DVDs, or any other like suitable storage device or medium.

Executable sequences described herein can be implemented with one or more sequences of code contained in a memory. In some implementations, such code can be read into the memory from another machine-readable medium. Execution of the sequences of instructions contained in the memory can cause a processor 538 to perform the process steps described herein. One or more processors 538 in a multi-processing arrangement can also be employed to execute instruction sequences in the memory. In addition, hard-wired circuitry can be used in place of or in combination with software instructions to implement various implementations described herein. Thus, the present implementations are not limited to any specific combination of hardware and/or software.

As used herein, a machine-readable medium will refer to any medium that directly or indirectly provides instructions to the processor 538 for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROMs, DVDs, other like optical media, punch cards, paper tapes and like physical media with patterned holes, RAM, ROM, PROM, EPROM and flash EPROM.

As further shown in FIG. 5, the processor 538 can be communicatively connected to one or more seismic detectors (three seismic detectors 560a, 560b, and 560b are shown) and a seismic source 550. Although one seismic source is shown, it is appreciated that more than one seismic source can be provided.

In one or more implementations, the seismic source 550 (also referred to as a "shot") is a device that generates controlled seismic energy and directs this energy into an underground formation. The seismic source 550 can generate seismic energy in a variety of ways, such as through an explosive device (e.g., dynamite or other explosive charge), an air gun, a plasma sound source, a "thumper truck," an electromagnetic pulse source, a seismic vibrator, or other devices that can generate seismic energy in a controlled manner. Seismic sources can provide single pulses of seismic energy or continuous sweeps of seismic enemy.

The seismic detector 560 (such as a geophone) is a device used in seismic acquisition that detects ground velocity produced by seismic waves and transforms the motion into electrical impulses. The seismic detector 560 can detect motion in a variety of ways, for example through the use of an analog device (e.g., a sprint-mounted magnetic mass moving within a wire coil) or a microelectromechanical (MEMS) device (e.g., a MEMS device that generates an electrical signal in response to ground motion) through an active feedback circuit).

In one or more implementations, a downhole tool can include one or more seismic sources (e.g., the seismic source 550) and one or more seismic detectors (e.g., the seismic detectors 560a, 560b, and 560b).

To obtain zero-offset VSP data for generating the corridor stack (e.g., in block 102 of the process 100), the processor 538 communicates with the seismic detectors 560a, 560b, and 560c and the seismic source 550 to send and receive information (e.g., an output) from seismic detectors 560a, 560b, and 560c and the seismic source 550, and to control the operation of the seismic detectors 560a, 560b, and 560c and the seismic source 550.

As shown, the seismic source 550 is positioned along the upper surface of the subterranean formation 518, the seismic detectors 560a, 560b, and 560c are positioned below the upper surface of the subterranean formation 518 within the wellbore 516. In an example, Seismic sources 550 and the seismic detectors 560a, 560b, and 560c are communicatively connected to processor 538 through a communications interface (not shown). Examples of a communications interface include wired connectors or wireless transceivers.

The drilling assembly 500 may further include a bottom hole assembly (BHA) coupled to the drill string 508 near the drill bit 514. The BHA may comprise various downhole measurement tools such as, but not limited to, measurement-while-drilling (MWD) and logging-while-drilling (LWD) tools, which may be configured to take downhole and/or uphole measurements of the surrounding subterranean formations 518. Along the drill string 508, logging while drilling (LWD) or measurement while drilling (MWD) equipment 536 is included. In one or more implementations, the drilling assembly 500 involves drilling the wellbore 516 while the logging measurements are made with the LWD/MWD equipment 536. More generally, the methods described herein involve introducing a logging tool into the wellbore that is capable of determining wellbore parameters, including mechanical properties of the formation. The logging tool may be an LWD logging tool, a MWD logging tool, a wireline logging tool, slickline logging tool, and the like. Further, it is understood that any processing performed by the logging tool may occur only uphole, only downhole, or at least some of both (i.e., distributed processing).

According to the present disclosure, the LWD/MWD equipment 536 may include a stationary acoustic sensor and a moving acoustic sensor used to detect the flow of fluid flowing into and/or adjacent the wellbore 516. In an example, the stationary acoustic sensor may be arranged about the longitudinal axis of the LWD/MWD equipment 536, and, thus, of the wellbore 516 at a predetermined fixed location within the wellbore 516. The moving acoustic sensor may be arranged about the longitudinal axis of the LWD/MWD equipment 536, and, thus, of the wellbore 516, and is configured to move along the longitudinal axis of the wellbore 516. However, the arrangement of the stationary acoustic sensor and the moving acoustic sensor is not limited thereto and the acoustic sensors may be arranged in any configuration as required by the application and design.

The LWD/MWD equipment 536 may transmit the measured data to a processor 538 at the surface wired or wirelessly. Transmission of the data is generally illustrated at line 540 to demonstrate communicable coupling between the processor 538 and the LWD/MWD equipment 536 and does not necessarily indicate the path to which communication is achieved. The stationary acoustic sensor and the moving acoustic sensor may be communicably coupled to the line 540 used to transfer measurements and signals from the BHA to the processor 538 that processes the acoustic measurements and signals received by acoustic sensors (e.g., stationary acoustic sensor, moving acoustic sensor) and/or controls the operation of the BHA. In the subject technology, the LWD/MWD equipment 536 may be capable of logging analysis of the subterranean formation 518 proximal to the wellbore 516.

In some implementations, part of the processing may be performed by a telemetry module (not shown) in combination with the processor 538. For example, the telemetry module may pre-process the individual sensor signals (e.g., through signal conditioning, filtering, and/or noise cancellation) and transmit them to a surface data processing system (e.g., the processor 538) for further processing. It is appreciated that any processing performed by the telemetry module may occur only uphole, only downhole, or at least some of both (i.e., distributed processing).

In various implementations, the processed acoustic signals are evaluated in conjunction with measure from other sensors (e.g., temperature and surface well pressure measurements) to evaluate flow conditions and overall well integrity. The telemetry module may encompass any known means of downhole communication including, but not limited to, a mud pulse telemetry system, an acoustic telemetry system, a wired communications system, a wireless communications system, or any combination thereof. In certain implementations, some or all of the measurements taken by the stationary acoustic sensor and the moving acoustic sensor may also be stored within a memory associated with the acoustic sensors or the telemetry module for later retrieval at the surface upon retracting the drill string 508.

Figure 6:
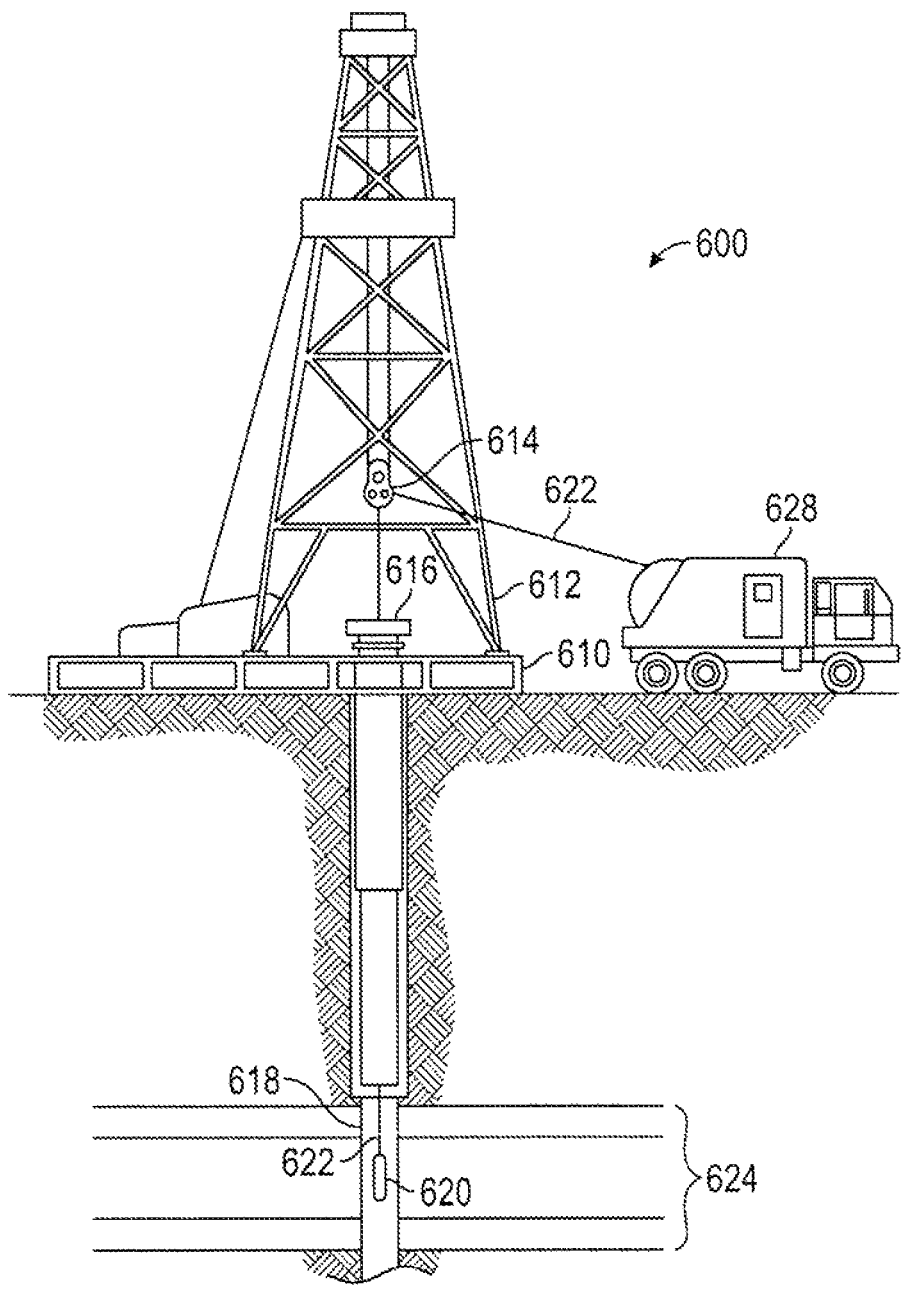
FIG. 6 illustrates a wireline system suitable for implementing the processes described herein in accordance with some implementations.

FIG. 6 illustrates a logging assembly 600 having a wireline system suitable for implementing the methods described herein. As illustrated, a platform 610 may be equipped with a derrick 612 that supports a hoist 614. Drilling oil and gas wells, for example, are commonly carried out using a string of drill pipes connected together so as to form a drilling string that is lowered through a rotary table 616 into a wellbore 618. Here, it is assumed that the drilling string has been temporarily removed from the wellbore 618 to allow a logging tool 620 (and/or any other appropriate wireline tool) to be lowered by wireline 622, slickline, coiled tubing, pipe, downhole tractor, logging cable, and/or any other appropriate physical structure or conveyance extending downhole from the surface into the wellbore 618. Typically, the logging tool 620 is lowered to a region of interest and subsequently pulled upward at a substantially constant speed. During the upward trip, instruments included in the logging tool 620 may be used to perform measurements on the subterranean formation 624 adjacent the wellbore 618 as the logging tool 620 passes by. Further, it is understood that any processing performed by the logging tool 620 may occur only uphole, only downhole, or at least some of both (i.e., distributed processing).

The logging tool 620 may include one or more wireline instrument(s) that may be suspended into the wellbore 618 by the wireline 622. The wireline instrument(s) may include the stationary acoustic sensor and the moving acoustic sensor, which may be communicably coupled to the wireline 622. The wireline 622 may include conductors for transporting power to the wireline instrument and also facilitate communication between the surface and the wireline instrument. The logging tool 620 may include a mechanical component for causing movement of the moving acoustic sensor. In some implementations, the mechanical component may need to be calibrated to provide a more accurate mechanical motion when the moving acoustic sensor is being repositioned along the longitudinal axis of the wellbore 618.

The acoustic sensors (e.g., the stationary acoustic sensor, the moving acoustic sensor) may include electronic sensors, such as hydrophones, piezoelectric sensors, piezoresistive sensors, electromagnetic sensors, accelerometers, or the like. In other implementations, the acoustic sensors may comprise fiber optic sensors, such as point sensors (e.g., fiber Bragg gratings, etc.) distributed at desired or predetermined locations along the length of an optical fiber. In yet other implementations, the acoustic sensors may comprise distributed acoustic sensors, which may also use optical fibers and permit a distributed measurement of local acoustics at any given point along the fiber. In still other implementations, the acoustic sensors may include optical accelerometers or optical hydrophones that have fiber optic cablings.

Additionally or alternatively, in an example (not explicitly illustrated), the acoustic sensors may be attached to or embedded within the one or more strings of casing lining the wellbore 618 and/or the wall of the wellbore 618 at an axially spaced pre-determined distance.

A logging facility 628, shown in FIG. 6 as a truck, may collect measurements from the acoustic sensors (e.g., the stationary acoustic sensor, the moving acoustic sensor), and may include the processor 538 for controlling, processing, storing, and/or visualizing the measurements gathered by the acoustic sensors. The processor 538 may be communicably coupled to the wireline instrument(s) by way of the wireline 622. Alternatively, the measurements gathered by the logging tool 620 may be transmitted (wired or wirelessly) or physically delivered to computing facilities off-site where the methods and processes described herein may be implemented.

In an example, one or more seismic detectors can be disposed in the logging tool 620, where the wireline 622 controls the depth of the logging tool 620 into the wellbore 618 and provides a channel for communication to the upper surface of the subterranean formation 624, (e.g., to the processor 538). One or more seismic sources may be positioned along the upper surface of the subterranean formation 624. To obtain zero-offset VSP data for generating the corridor stack (e.g., in block 102 of the process 100), the processor 538 communicates with the seismic detectors and the seismic sources to send and receive information from the seismic detectors and the seismic sources, and to control the operation of the seismic detectors and the seismic source.

Figure 7:
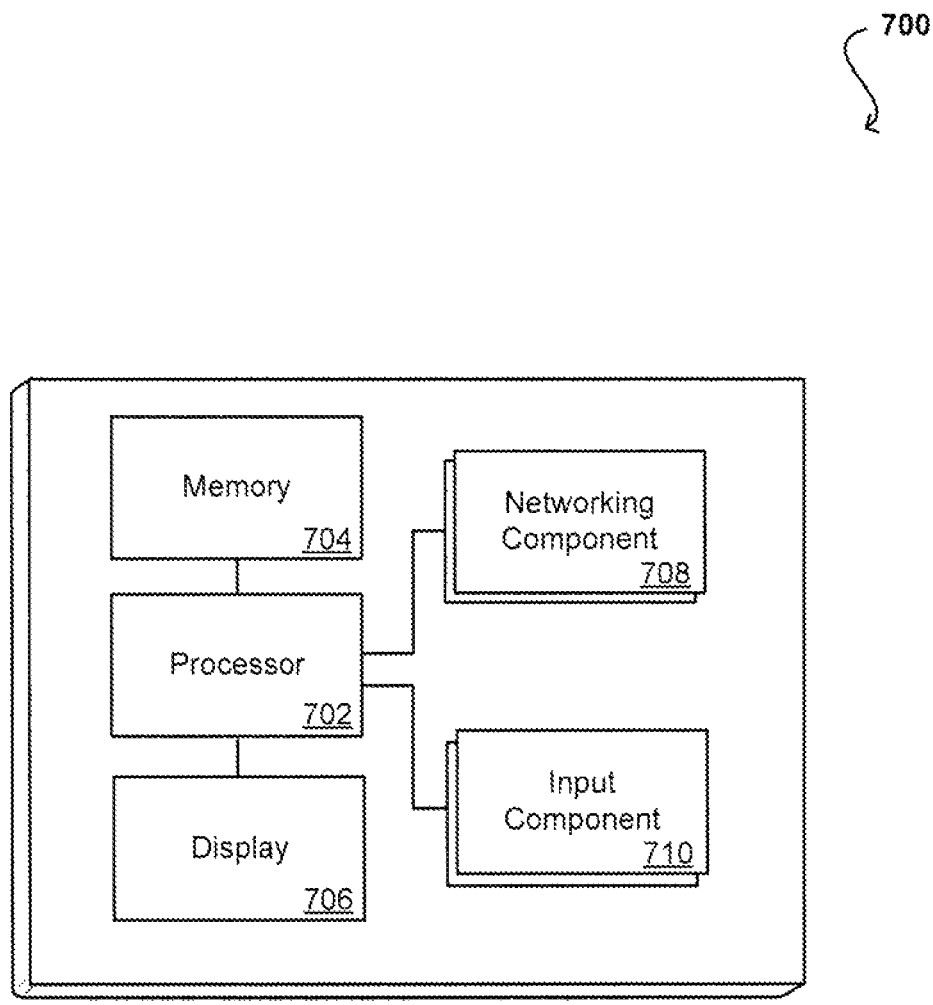
FIG. 7 illustrates a schematic diagram of a set of general components of an example computing device in accordance with some implementations.

FIG. 7 illustrates a schematic diagram of a set of general components of an example computing device 700. In this example, the computing device 700 includes a processor 702 for executing instructions that can be stored in a memory device or element 704. The computing device 700 can include many types of memory, data storage, or non-transitory computer-readable storage media, such as a first data storage for program instructions for execution by the processor 702, a separate storage for images or data, a removable memory for sharing information with other devices, etc.

The computing device 700 typically may include some type of display element 706, such as a touch screen or liquid crystal display (LCD). As discussed, the computing device 700 in many embodiments will include at least one input element 710 able to receive conventional input from a user. This conventional input can include, for example, a push button, touch pad, touch screen, wheel, joystick, keyboard, mouse, keypad, or any other such device or element whereby a user can input a command to the device. In some embodiments, however, such the computing device 700 might not include any buttons at all, and might be controlled only through a combination of visual and audio commands, such that a user can control the computing device 700 without having to be in contact with the computing device 700. In some embodiments, the computing device 700 of FIG. 7 can include one or more network interface elements 708 for communicating over various networks, such as a Wi-Fi, Bluetooth, RF, wired, or wireless communication systems. The computing device 700 in many embodiments can communicate with a network, such as the Internet, and may be able to communicate with other such computing devices.

Figure 8:
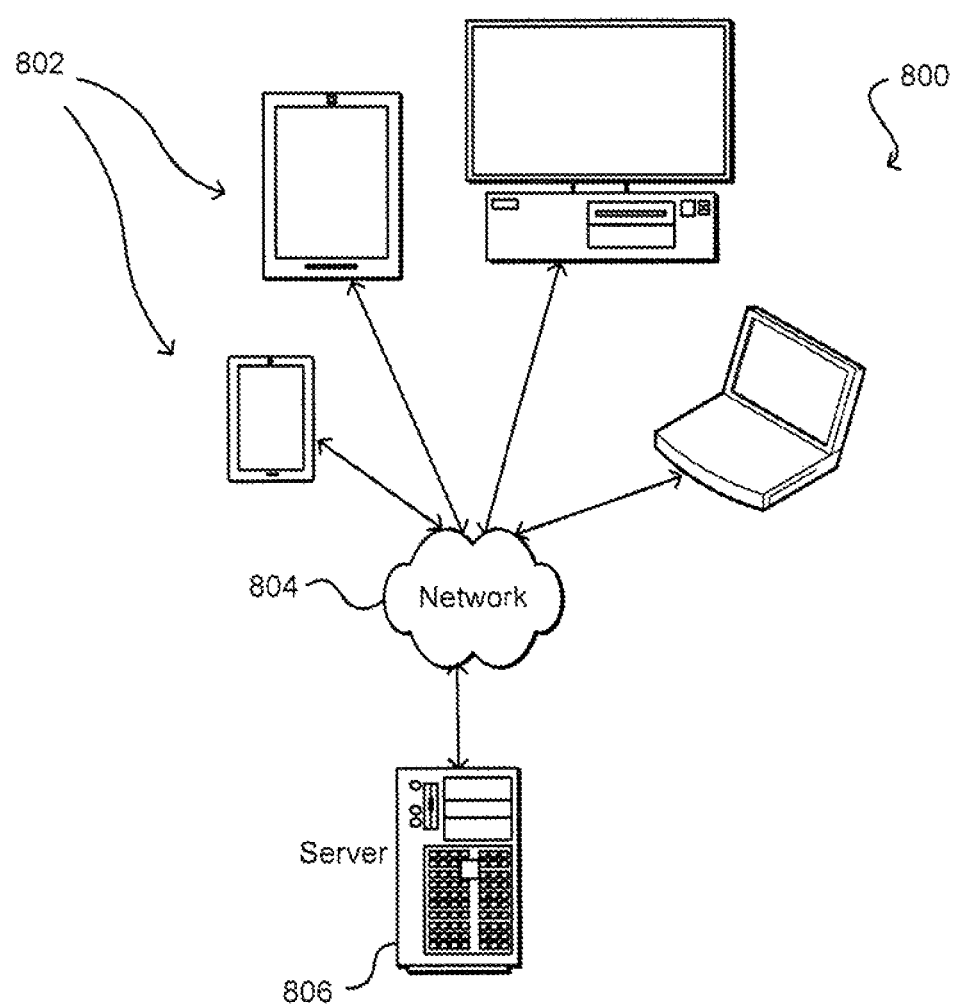
FIG. 8 illustrates a schematic diagram of an example of an environment for implementing aspects in accordance with some implementations.

As discussed herein, different approaches can be implemented in various environments in accordance with the described embodiments. For example, FIG. 8 illustrates a schematic diagram of an example of an environment 800 for implementing aspects in accordance with various embodiments. As will be appreciated, although a client-server based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like.

The network 804 can include any appropriate network, including an intranet, the Internet, a cellular network, a local area network or any other such network or combination thereof. The network 804 could be a "push" network, a "pull" network, or a combination thereof. In a "push" network, one or more of the servers push out data to the client device in a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network 804 can be enabled via wired or wireless connections and combinations thereof. In this example, the network includes the Internet, as the environment includes a server 806 for receiving requests and serving content in response thereto, although for other networks, an alternative device serving a similar purpose could be used, as would be apparent to one of ordinary skill in the art.

The client device 802 may represent the logging tool 620 of FIG. 6 and the server 806 may represent the processor 538 of FIG. 5 in some implementations, or the client device 802 may represent the processor 538 and the server 806 may represent the off-site computing facilities in other implementations.

The server 806 typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various implementations.

Various examples of aspects of the disclosure are described below as clauses for convenience. These are provided as examples, and do not limit the subject technology.

Clause 1. A method comprising: generating a corridor stack based on vertical seismic profile (VSP) data of a wellbore in a subterranean formation; generating an initial estimate of a velocity model for the subterranean formation below the wellbore; generating a density model for the subterranean formation below the wellbore based on information from nearby wells; inverting, based on a global inversion algorithm and the initial estimate of the velocity model, the generated corridor stack to determine a set of velocity models; generating impedance models in a depth domain based on the generated density model and the set of velocity models; and storing the generated impedance models.

Clause 2. The method of Clause 1, further comprising: providing, for display, the generated impedance models.

Clause 3. The method of Clause 1, wherein the generated impedance models are indicative of an estimate of uncertainty in depth and the VSP data comprises zero offset VSP data.

Clause 4. The method of Clause 1, further comprising: estimating a source wavelet; and generating a set of synthetic seismograms based on the source wavelet.

Clause 5. The method of Clause 4, wherein generating the set of synthetic seismograms further comprises: generating an impedance model based on multiplying the generated initial estimate of the velocity model with the generated density model; generating a reflectivity series based on differentiating the impedance model; and performing convolution on the reflectivity series and the estimated source wavelet to provide the generated set of synthetic seismograms.

Clause 6. The method of Clause 4, wherein inverting the generated corridor stack further comprises: determining a scaling factor for a comparison between the generated set of synthetic seismograms and the generated corridor stack.

Clause 7. The method of Clause 4, wherein inverting the generated corridor stack further comprises: determining an initial parent population, the initial parent population include a number of population members, each population member representing a solution of inverting the generated corridor stack; generating a mutation population based on the initial parent population, the mutation population including a same number of population members as the number of population members of the initial parent population; determining a trial population based on a crossover probability rate applied to the mutation population; and generating a child population based on a comparison of the trial population and the initial parent population.

Clause 8. The method of Clause 7, wherein the initial parent population is determined based on a random set of numbers.

Clause 9. The method of Clause 7, further comprising: generating, a second mutation population based on the generated child population; determining a second trial population based on the crossover probability rate applied to the second mutation population; determining that a stopping criteria is satisfied; and determining a final population based on a comparison of the generated child population, the second mutation population, and the second trial population, wherein the final population comprises the set of velocity models.

Clause 10. The method of Clause 9, wherein the global inversion algorithm comprises an evolutionary algorithm, and the stopping criteria is based on a number of iterations of the evolutionary algorithm or a predetermined level for an objective function.

Clause 11. The method of Clause 9, wherein the final population represents an inversion answer for inverting the generated corridor stack.

Clause 12. The method of Clause 1, wherein a potential geohazard is indicated at least in part by a degree of change between respective impedance values in the generated impedance models.

Clause 13. The method of Clause 1, wherein generating the corridor stack based on VSP data of the wellbore in the subterranean formation further comprises: generating, using one of more seismic sources, seismic energy into the wellbore in the subterranean formation; receiving, using one or more seismic detectors, the generated seismic energy; and generating the VSP data based on an output from the one or more seismic detectors.

Clause 14. A system comprising: a processor; and a memory device including instructions that, when executed by the processor, cause the processor to: generate a corridor stack based on vertical seismic profile (VSP) data of a wellbore in a subterranean formation; generate an initial estimate of a velocity model for the subterranean formation below the wellbore; generate a density model for the subterranean formation below the wellbore based on information from nearby wells; invert, based on a global inversion algorithm and the initial estimate of the velocity model, the generated corridor stack to determine a set of velocity models; generate impedance models in a depth domain based on the generated density model and the set of velocity models; and store the generated impedance models.

Clause 15. The system of Clause 14, wherein the instructions further cause the processor to: provide, for display, the generated impedance models.

Clause 16. The system of Clause 14, wherein the generated impedance models are indicative of an estimate of uncertainty in depth and the VSP data comprises zero offset VSP data.

Clause 17. The system of Clause 14, wherein the instructions further cause the processor to: estimating a source wavelet; and generating a set of synthetic seismograms based on the source wavelet.

Clause 18. The system of Clause 17, wherein to generate the set of synthetic seismograms further comprises: generating an impedance model based on multiplying the generated initial estimate of the velocity model with the generated density model; generating a reflectivity series based on differentiating the impedance model; and performing convolution on the reflectivity series and the estimated source wavelet to provide the generated set of synthetic seismograms.

Clause 19. The system of Clause 17, wherein to invert the generated corridor stack further comprises: determining a scaling factor for a comparison between the generated set of synthetic seismograms and the generated corridor stack.

Clause 20. The system of Clause 17, wherein to invert the generated corridor stack further comprises: determining an initial parent population, the initial parent population include a number of population members, each population member representing a solution of inverting the generated corridor stack; generating a mutation population based on the initial parent population, the mutation population including a same number of population members as the number of population members of the initial parent population; determining a trial population based on a crossover probability rate applied to the mutation population; and generating a child population based on a comparison of the trial population and the initial parent population.

Clause 21. The system of Clause 20, wherein the initial parent population is determined based on a random set of numbers.

Clause 22. The system of Clause 20, wherein the instructions further cause the processor to: generate a second mutation population based on the generated child population; determine a second trial population based on the crossover probability rate applied to the second mutation population; determine that a stopping criteria is satisfied; and determine a final population based on a comparison of the generated child population, the second mutation population, and the second trial population, wherein the final population comprises the set of velocity models.

Clause 23. The system of Clause 22, wherein the global inversion algorithm comprises an evolutionary algorithm, and the stopping criteria is based on a number of iterations of the evolutionary algorithm or a predetermined level for an objective function.

Clause 24. The system of Clause 22, wherein the final population represents an inversion answer for inverting the generated corridor stack.

Clause 25. The system of Clause 14, wherein a potential geohazard is indicated at least in part by a degree of change between respective impedance values in the generated impedance models.

Clause 26. The system of Clause 14, wherein the system further includes a downhole tool, the downhole tool comprises one or more seismic sources and one or more seismic detectors, and the instructions further cause the processor to: generate, using the one or more seismic sources, seismic energy into the wellbore in the subterranean formation; receive, using the one or more seismic detectors, the generated seismic energy; and generate the VSP data based on an output from the one or more seismic detectors.

Clause 27. The system of Clause 26, wherein the downhole tool is one of a logging-while-drilling tool, or a wireline tool.

Clause 28. A non-transitory computer-readable medium including instructions stored therein that, when executed by at least one computing device, cause the at least one computing device to: generating a corridor stack based on vertical seismic profile (VSP) data of a wellbore in a subterranean formation; generating an initial estimate of a velocity model for the subterranean formation below the wellbore; generating a density model for the subterranean formation below the wellbore based on information from nearby wells; inverting, based on a global inversion algorithm and the initial estimate of the velocity model, the generated corridor stack to determine a set of velocity models; generating impedance models in a depth domain based on the generated density model and the set of velocity models; and storing the generated impedance models.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, of C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method comprising:
   generating a corridor stack based on vertical seismic profile (VSP) data of a wellbore in a subterranean formation;
   generating an initial estimate of a velocity model for the subterranean formation below the wellbore;
   generating a density model for the subterranean formation below the wellbore based on information from nearby wells;
   inverting, based on a global inversion algorithm and the initial estimate of the velocity model, the generated corridor stack to determine a set of velocity models;
   generating impedance models in a depth domain based on the generated density model and the set of velocity models; and
   storing the generated impedance models.

2. The method of claim 1, further comprising:
   providing, for display, the generated impedance models.

3. The method of claim 1, wherein the generated impedance models are indicative of an estimate of uncertainty in depth and the VPS data comprises zero offset VSP data.

4. The method of claim 1, further comprising:
   estimating a source wavelet; and
   generating a set of synthetic seismograms based on the source wavelet.

5. The method of claim 4, wherein generating the set of synthetic seismograms further comprises:
   generating an impedance model based on multiplying the generated initial estimate of the velocity model with the generated density model;
   generating a reflectivity series based on differentiating the impedance model; and
   performing convolution on the reflectivity series and the estimated source wavelet to provide the generated set of synthetic seismograms.

6. The method of claim 4, wherein inverting the generate d corridor stack further comprises:
   determining a scaling factor for a comparison between thee generated set of synthetic seismograms and the generated corridor stack.

7. The method of claim 4, wherein inverting the generated corridor stack further comprises:
   determining an initial parent population, the initial parent population include a number of population members, each population member representing a solution of inverting the generated corridor stack;
   generating a mutation population based on the initial parent population, the mutation population including a same number of population members as the number of population members of the initial parent population;
   determining a trial population based on a crossover probability rate applied to the mutation population; and
   generating a child population based on a comparison of the trial population and the initial parent population.

8. The method of claim 7, wherein the initial parent population is determined based on a random set of numbers.

9. The method of claim 7, further comprising:
   generating a second mutation population based on the generated child population;
   determining a second trial population based on the crossover probability rate applied to the second mutation population;
   determining that a stopping criteria is satisfied; and
   determining a final population based on a comparison of the generated child population, the second mutation population, and the second trial population, wherein the final population comprises the set of velocity models.

10. The method of claim 9, wherein the global inversion algorithm comprises an evolutionary algorithm, and the stopping criteria is based on a number of iterations of the evolutionary algorithm or a predetermined level for an objective function.

11. The method of claim 9, wherein the final population represents an inversion answer for inverting the generated corridor stack.

12. The method of claim 1, wherein a potential geohazard is indicated at least in part by a degree of change between respective impedance values in the generated impedance models.

13. The method of claim 1, wherein generating the corridor stack based on VSP data of the wellbore in the subterranean formation further comprises:
generating, using one or more seismic sources, seismic energy into the wellbore in the subterranean formation;
receiving, using one or more seismic detectors, the generated seismic energy; and
generating the VSP data based on an output from the one or more seismic detectors.

14. A system comprising:
a processor; and
a memory device including instructions that, when executed by the processor, cause the processor to:
generate a corridor stack based on vertical seismic profile (VSP) data of a wellbore in a subterranean formation;
generate an initial estimate of a velocity model for the subterranean formation below the wellbore;
generate a density model for the subterranean formation below the wellbore based on information from nearby wells;
invert, based on a global inversion algorithm and the initial estimate of the velocity model, the generated corridor stack to determine a set of velocity models;
generate impedance models in a depth domain based on the generated density model and the set of velocity models; and
store the generated impedance models.

15. The system of claim 14, wherein the instructions further cause the processor to:
provide, for display, the generated impedance models.

16. The system of claim 14, wherein the generated impedance models are indicative of an estimate of uncertainty in depth and the VSP data comprises zero offset VSP data.

17. The system of claim 14, wherein the instructions further cause the processor to:
estimating a source wavelet; and
generating a set of synthetic seismograms based on the source wavelet.

18. The system of claim 17, wherein to generate the set of synthetic seismograms further comprises:
generating an impedance model based on multiplying the generated initial estimate of the velocity model with the generated density model;
generating a reflectivity series based on differentiating the impedance model; and
performing convolution on the reflectivity series and the estimated source wavelet to provide the generated set of synthetic seismograms.

19. The system of claim 17, wherein to invert the generated corridor stack further comprises:
determining a scaling factor for a comparison between the generated set of synthetic seismograms and the generated corridor stack.

20. The system of claim 17, wherein to invert the generated corridor stack further comprises:
determining an initial parent population, the initial parent population include a number of population members, each population member representing a solution of inverting the generated corridor stack;
generating a mutation population based on the initial parent population, the mutation population including a same number of population members as the number of population members of the initial parent population;
determining a trial population based on a crossover probability rate applied to the mutation population; and
generating a child population based on a comparison of the trial population and the initial parent population.

21. The system of claim 20, wherein the initial parent population is determined based on a random set of numbers.

22. The system of claim 20, wherein the instructions further cause the processor to:
generate a second mutation population based on the generated child population;
determine a second trial population based on the crossover probability rate applied to the second mutation population;
determine that a stopping criteria is satisfied; and
determine a final population based on a comparison of the generated child population, the second mutation population, and the second trial population, wherein the final population comprises the set of velocity models.

23. The system of claim 22, wherein the global inversion algorithm comprises an evolutionary algorithm, and the stopping criteria is based on a number of iterations of the evolutionary algorithm or a predetermined level for an objective function.

24. The system of claim 22, wherein the final population represents an inversion answer for inverting the generated corridor stack.

25. The system of claim 14, wherein a potential geohazard is indicated at least in part by a degree of change between respective impedance values in the generated impedance models.

26. The system of claim 14, wherein the system further includes a downhole tool, the downhole tool comprises one or more seismic sources and one or more seismic detectors, and the instructions further cause the processor to:
generate, using the one or more seismic sources, seismic energy into the wellbore in the subterranean formation;
receive, using the one or more seismic detectors, the generated seismic energy; and
generate the VSP data based on an output from the one or more seismic detectors.

27. The system of claim 26, wherein the downhole tool is one of a logging-while-drilling tool, or a wireline tool.

28. A non-transitory computer-readable medium including instructions stored therein that, when executed by at least one computing device, cause the at least one computing device to:
generating a corridor stack based on vertical seismic profile (VSP) data of a wellbore in a subterranean formation;
generating an initial estimate of a velocity model for the subterranean formation below the wellbore;
generating a density model for the subterranean formation below the wellbore based on information from nearby wells;
inverting, based on a global inversion algorithm and the initial estimate of the velocity model, the generated corridor stack to determine a set of velocity models;
generating impedance models in a depth domain based on the generated density model and the set of velocity models; and
storing the generated impedance models.

* * * * *